United States Patent [19]

Serizawa et al.

[11] Patent Number: 4,902,028
[45] Date of Patent: Feb. 20, 1990

[54] FRONT AND REAR WHEEL STEERING APPARATUS FOR MOTOR VEHICLES

[75] Inventors: Mitsuya Serizawa; Tetsurou Hamada; Norio Ukai, all of Tochigi, Japan

[73] Assignee: Honda Giken Kogyo Kabushiki Kaisha, Tokyo, Japan

[21] Appl. No.: 245,465

[22] Filed: Sep. 16, 1988

[30] Foreign Application Priority Data

Sep. 16, 1987 [JP] Japan ............................. 62-231406
Nov. 12, 1987 [JP] Japan ............................. 62-286158

[51] Int. Cl.⁴ .................................................. B62D 7/14
[52] U.S. Cl. ...................................... 280/91; 180/140
[58] Field of Search ............... 180/140, 142, 141, 143; 280/91

[56] References Cited

U.S. PATENT DOCUMENTS

| | | | |
|---|---|---|---|
| 2,949,046 | 8/1960 | Critelli | 74/688 |
| 3,262,527 | 7/1966 | Allaben | 192/58 B |
| 3,651,903 | 3/1972 | Butler et al. | 188/290 |
| 3,760,922 | 9/1973 | Rolt et al. | 180/248 |
| 4,557,493 | 12/1985 | Sano et al. | 280/91 |
| 4,614,351 | 9/1986 | Sano et al. | 280/91 |
| 4,669,745 | 6/1987 | Miki et al. | 180/140 |
| 4,700,960 | 10/1987 | Miki et al. | 180/140 |
| 4,702,333 | 10/1987 | Lippert | 280/91 |
| 4,703,822 | 11/1987 | Kawamoto | 280/91 |
| 4,730,839 | 3/1988 | Miyoshi | 280/91 |

FOREIGN PATENT DOCUMENTS

58-30869  2/1983  Japan .
61-9378   1/1986  Japan .

Primary Examiner—Richard A. Bertsch
Attorney, Agent, or Firm—Irving M. Weiner; Joseph P. Carrier; Pamela S. Burt

[57] ABSTRACT

An apparatus for steering the front and rear wheels of a motor vehicle includes a front wheel steering mechanism for steering the front wheels in response to operation of a steering wheel, a rear wheel steering mechanism for steering the rear wheels at least in the same direction as the direction in which the front wheels are steered, and a connector shaft mechanically interconnecting the front and rear wheel steering mechanisms. A rotation control mechanism employing a viscous fluid is mounted on the connector shaft for applying a resistive force dependent on the speed of rotation of the steering wheel to the connector shaft.

11 Claims, 8 Drawing Sheets

FRONT AND REAR WHEEL STEERING APPARATUS FOR MOTOR VEHICLES

BACKGROUND OF THE INVENTION

1. Field of the Invention:

The present invention relates to a front and rear wheel steering apparatus for steering both front and rear wheels of a motor vehicle, and more particularly to a front and rear wheel steering apparatus having a front wheel steering mechanism and a rear wheel steering mechanism which are mechanically operatively coupled to each other.

2. Description of the Relevant Art:

Front and rear wheel steering apparatus for motor vehicles are roughly classified into a group in which rear wheels are steered mechanically through a front wheel steering mechanism, and another group in which rear wheels are electrically steered independently of front wheels. The present invention is directed to a front and rear wheel steering apparatus belonging to the former class.

Typical mechanically operated front and rear wheel steering apparatus are disclosed in Japanese Laid-Open Patent Publications Nos. 58-30869 and 61-9378. The disclosed front and rear wheel steering apparatus has a front wheel steering mechanism and a rear wheel steering mechanism, the front wheel steering wheel mechanism being mechanically coupled to a steering wheel through a steering shaft and other members. The front and rear wheel steering mechanisms are mechanically coupled to each other by a shaft and other members for steering front and rear wheels.

In the conventional front and rear wheel steering apparatus, the steering wheel, the front wheel steering mechanism, and the rear wheel steering mechanism are mechanically coupled to uniquely determine the steering angle of the rear wheels dependent on the steering angle of the front wheels. Therefore, the cornering forces which the rear wheels produce during high-speed running of the motor vehicle, i.e., the steering characteristics of the motor vehicle, may not sufficiently reflect the steering intention of the driver of the motor vehicle or the conditions of the road on which the motor vehicle is running. As a result, the prior front and rear wheel steering apparatus tends to fail to fully have the benefit of its excellent steering characteristics.

Another problem is that if the ratio of front and rear steering angles is increased for higher maneuvering stability, then the motor vehicle develops an understeering tendency, making it difficult to turn the motor vehicle as desired.

SUMMARY OF THE INVENTION

According to the present invention, there is provided an apparatus for steering the front and rear wheels of a motor vehicle, comprising: a steering wheel; front and rear wheels; a front wheel steering mechanism for steering the front wheels in response to operation of the steering wheel; a rear wheel steering mechanism for steering the rear wheels at least in the same direction as the direction in which the front wheels are steered; connector means disposed between and operatively interconnecting the front and rear wheel steering mechanisms for transmitting rotation of the steering wheel to the rear wheel steering mechanism through the front wheel steering mechanism; and a rotation control mechanism mounted on the connector means for applying a resistive force dependent on the speed of rotation of the steering wheel to the connector means.

In the motor vehicle equipped with the front and rear wheel steering apparatus, the rear wheels are given steering characteristics dependent on the speed at which the driver of the motor vehicle turns the steering wheel.

When the steering speed is high, indicating that the driver wants to change the direction of travel of the motor vehicle quickly, the rear wheels can be steered through a relatively large angle. When the reactive forces against the steering movement are small, e.g., when the coefficient of friction of the road on which the motor vehicle is running is small, even if the steering speed is low, a large steering force is transmitted to the rear wheels for thereby improving driving stability.

Vibration produced on the side of the rear wheels and transmitted to the steering wheel is lowered.

Moreover, the ratio between the steering angles of the front and rear wheels is increased for higher driving stability and maintaining a desired degree of maneuverability, i.e., the ease with which the motor vehicle makes a smaller turn.

The above and further details and advantages of the present invention will become apparent from the following detailed description of preferred embodiments thereof, when read in conjunction with the accompanying drawings.

BRIEF DESCRIPTION OF THE DRAWINGS

showing steering characteristics of the front and rear wheels; and

DETAILED DESCRIPTION OF THE PREFERRED EMBODIMENTS

Figure 1:
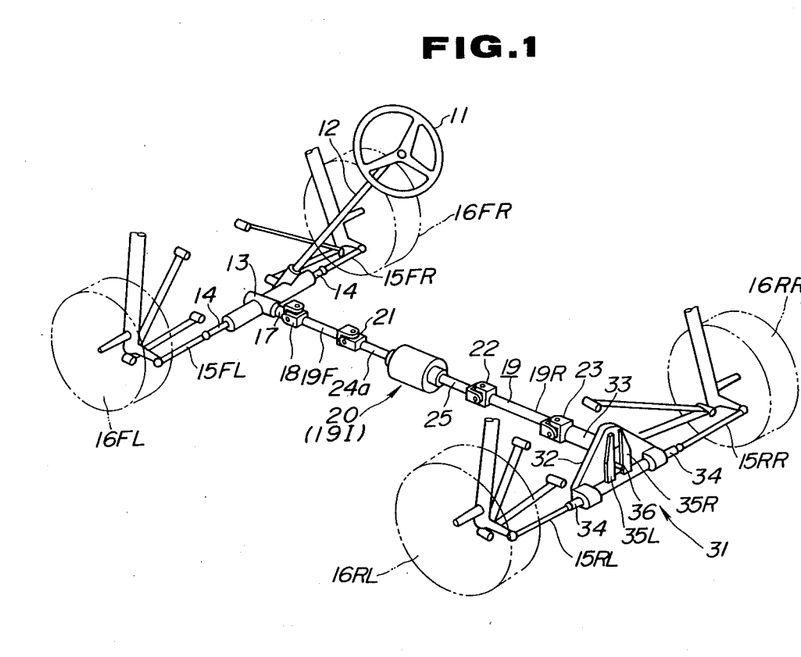
FIG. 1 is a perspective view of a front and rear wheel steering apparatus for a motor vehicle according to a first embodiment of the present invention.

FIG. 1 schematically illustrates a front and rear wheel steering apparatus for a motor vehicle according to a first embodiment of the present invention. A steering wheel 11 is operatively coupled via a steering shaft 12 to a rack-and-pinion steering gear mechanism of a front wheel steering mechanism which is housed in a gearbox 13. The front wheel steering mechanism includes a pinion (not shown) rotatable with the steering shaft 12 and held in mesh with a rack 14 that is slidably supported in the gearbox 13 for sliding movement in the transverse direction of the motor vehicle, for converting turning movement of the steering wheel 11 to axial movement of the rack 14. The rack 14 has opposite ends coupled to laterally spaced front wheels 16FL, 16FR through respective steering linkages such as tie rods 15FL, 15FR.

A rear wheel output shaft 17 is rotatably supported in the gearbox 13, the rear wheel output shaft 17 extending in the rearward direction of the motor vehicle. The rear wheel output shaft 17 has a front end operatively coupled to the rack 14 in the gearbox 13 through a transmission mechanism such as a worm gear for extracting steering forces from the front wheel steering mechanism. The rear end of the rear wheel output shaft 17 is operatively coupled to a connector shaft 19 through a universal joint 18. The connector shaft 19 comprises a front shaft 19F, an intermediate shaft 19I, and a rear shaft 19R which are operatively coupled by universal joints 21, 22. The intermediate shaft 19I in its entirety comprises a viscous fluid or shear coupling 20 which comprises a tubular shaft 24a integral with a housing and a hub shaft 25, as described later on. The front shaft 19F has a front end operatively coupled to the rear wheel output shaft 17 through the universal joint 18 and a rear end operatively coupled to the tubular shaft 24a of the viscous fluid or shear coupling 20 through the universal joint 21. The rear shaft 19R has a front end operatively coupled to the hub shaft 25 of the viscous fluid coupling 20 through the universal joint 22 and a rear end operatively coupled to a rear wheel steering mechanism 31 (described later) through a universal joint 23.

Figure 2:
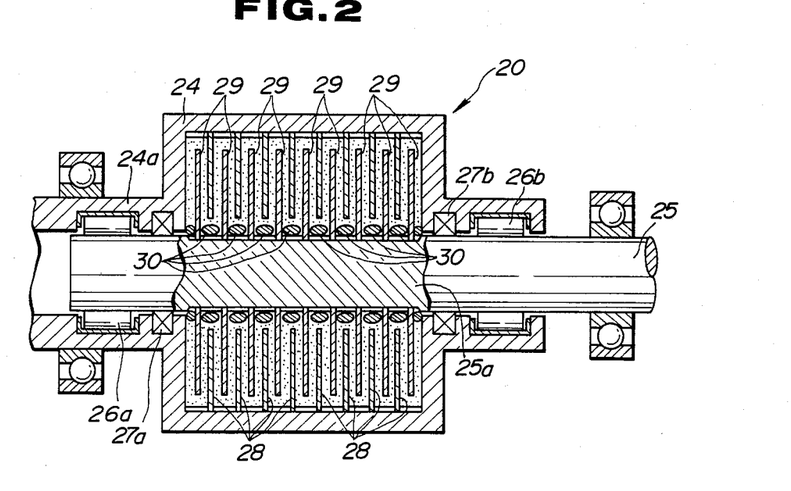
FIG. 2 is a cross-sectional view of a viscous fluid coupling mounted on a connector shaft.

As shown in FIG. 2, the viscous fluid coupling 20 has a substantially cylindrical housing 24 in which the hub shaft 25 is rotatably supported by means of needle bearings 26a, 26b. The housing 24 has a front end integral with the tubular shaft 24a coupled to the rear end of the front shaft 19F through the universal joint 21. The hub shaft 25 has a rear end coupled to the front end of the rear shaft 19R through the universal joint 22. The interior space in the housing 24 is closed in a fluidtight manner by means of seal members 27a, 27b disposed between the housing 24 and the hub shaft 25, and is filled with a highly viscous fluid such as silicone oil. A plurality of housing plates 28 are attached at their outer peripheral edges to the inner circumferential surface of the housing 24 through serrations or the like for axial movement with respect to the housing 24 but rotation with the housing 24. The hub shaft 25 has a portion 25a extending in the housing 24 and having an outer circumferential surface on which a plurality of hub plates 29 are mounted through serrations or the like for axial movement with respect to the hub shaft portion 25a but rotation with the hub shaft portion 25a. The housing plates 28 and the hub plates 29 are alternately disposed in the axial direction. Spacers 30 are interposed between the hub plates 29 to keep the hub plates 29 axially spaced. The viscous fluid or shear coupling 20 serves to transmit the torque between the front and rear shafts 19F, 19R since the viscous fluid between the plates 28, 29 generates a viscous resistive torque dependent upon the difference between relative rotational speeds of the housing plates 28 and the hub plates 29, i.e., the difference between relative rotational speeds of the front and rear shafts 19F, 19R of the connector shaft 19.

A rear wheel steering mechanism 31 includes an input shaft 33 rotatably supported in a bracket 32 mounted on the frame of the motor vehicle, the input shaft 33 extending longitudinally of the motor vehicle. The input shaft 33 has a front end operatively coupled to the rear end of the rear shaft 19R through the universal joint 23. A connector rod 34 extending transversely of the motor vehicle is transversely slidably supported on a lower portion of the rear surface of the bracket 32; A pair of vertical guide plates 35L, 35R which are transversely spaced from each other is mounted on the central portion of the connector rod 34. The input shaft 33 has a rear end to which there is fixed a crank member 36 lying between and capable of transversely pressing mutually confronting vertical surfaces of the guide plates 35L, 35R. The crank member 36 depends vertically downwardly when the steering wheel 11 is in its steering neutral position. When the input shaft 33 is rotated, i.e., the steering wheel 11 is turned, the crank member 36 presses one of the guide plates 35L, 35R in the transverse direction of the motor vehicle. The connector rod 34 has opposite ends operatively coupled to the knuckle arms of laterally spaced rear wheels 16RR, 16RL through steering linkages such as tie rods 15RL, 15RR, respectively. Wheel alignment of the rear wheels 16RL, 16RR for camber or caster is adjusted such that large self-aligning torque can be generated by the rear wheels 16RL, 16RR.

Operation of the front and rear wheel steering apparatus of the above embodiment will be described below.

Figure 7:
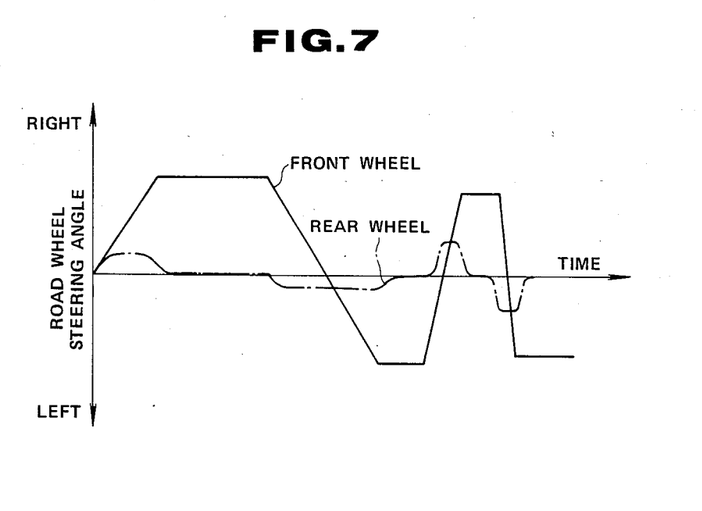
FIG. 7 is a graph showing steering angles, plotted against time, of front and rear wheels in the front and rear wheel steering apparatus of the first embodiment.

In the front and rear wheel steering apparatus, the steering wheel 11 is mechanically coupled to the front wheels 16FL, 16FR through the rack-and-pinion front wheel steering gear mechanism, etc., and the steering wheel 11 is mechanically coupled to the rear wheels 16RL, 16RR through the front wheel steering gear mechanism, the connector shaft 19, and the viscous fluid coupling 20, etc., so that the front wheels 16FL, 16FR and the rear wheels 16RL, 16RR can be steered in response to operation of the steering wheel 11. As illustrated in FIG. 7, as the steering wheel 11 is turned, the front wheels 16FL, 16FR are steered, and the turning movement of the steering wheel 11 is transmitted via the viscous fluid coupling 20 to the rear wheels 16RL, 16RR to cause the rear wheels 16RL, 16RR to be steered dependent on the steering angular velocity, i.e., the steering speed, of the front wheels 16FL, 16FR (as indicated by the dot-and-dash line in FIG. 7). To the rear wheels 16RL, 16RR, there is transmitted by the viscous fluid coupling 20 a steering force dependent on the difference between relative rotational speeds of the housing 24 and the hub shaft 25, i.e., the steering speed.

Thus, a larger steering force is transmitted when the steering speed is higher. As represented by the dot-and-dash line in FIG. 7, when the steering speed is higher, the rear wheels 16RL, 16RR are steered rapidly through a larger steering angle, giving the driver a good steering feeling. Since the difference between the relative rotational speeds of the housing 24 and the hub shaft 25 is affected by the resistance imposed by the hub shaft 25, i.e., the steering resistance imposed by the rear wheels 16RL, 16RR, the difference between the relative rotational speeds is small on a road having a small coefficient of friction, allowing the rear wheels 16RL, 16RR to be steered rapidly for improved maneuvering stability during travel on a wet road.

In the front and rear wheel steering apparatus, the rear wheels 16RL, 16RR are mechanically coupled to the steering wheel 11 through the rear wheel steering mechanism 31, the connector shaft 19, etc., with the viscous fluid coupling 20 mounted on the connector shaft 19. Therefore, any vibration which is transmitted from the rear wheels 16RL, 16RR to the steering wheel 11 is absorbed or reduced by the viscous fluid coupling 20, so that the driver is given a good steering feeling.

Figure 3:
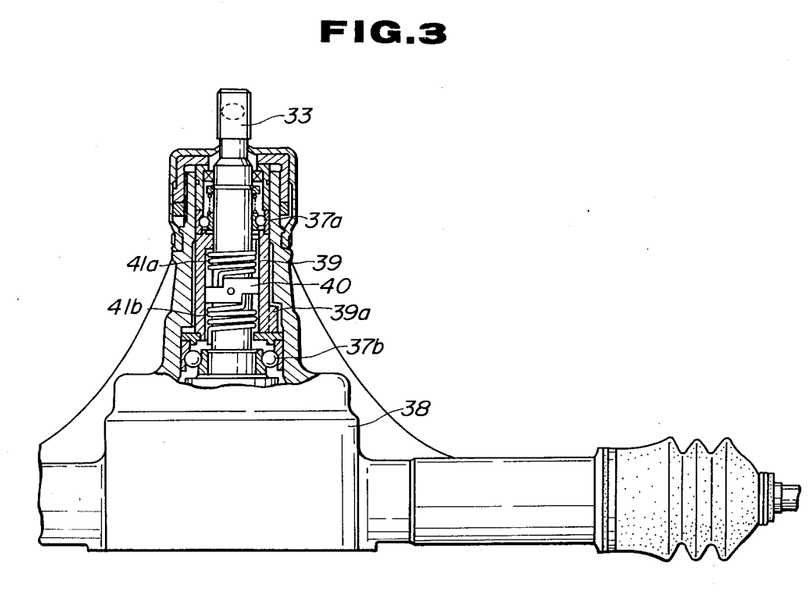
FIG. 3 is a cross-sectional view of a rear wheel steering mechanism.

FIG. 3 shows the rear wheel steering mechanism 31 in cross section. The input shaft 33 is rotatably supported in a gearbox 38 by means of a pair of ball bearings 37a, 37b and inserted through a distance collar 39 disposed between the outer races of the bearings 37a, 37b. The distance collar 39 is fitted in the gearbox 38 and has a stopper 39a on the rear end thereof which is fitted in the gearbox 38. A centering collar 40 is fixedly mounted on an intermediate portion of the input shaft 33. Torsion springs 41a, 41b are fitted over the input shaft 33 forwardly and rearwardly of the centering collar 40. The torsion springs 41a, 41b have inner ends engaging the centering collar 40 and outer ends engaging the distance collar 39 for normally urging the input shaft 33 into a neutral position, i.e., a position for keeping the rear wheels 16RL, 16RR in a straight-running position.

Since the rear wheels 16RL, 16RR are kept in the straight-running position by the torsion springs 41a, 41b, it is not necessary to increase the self-aligning torque for the rear wheels 16RL, 16RR, and the adjustment of compliance steer of the rear wheels 16RL, 16RR can easily be effected.

Figure 4:
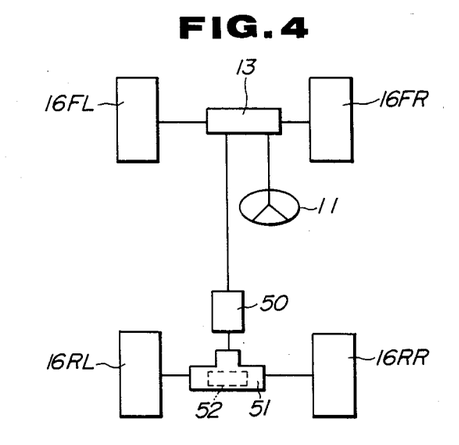
FIGS. 4, 5, and 6 are schematic views of front and rear wheel steering apparatus according to modifications of the first embodiment, the steering apparatus having steering angle ratio setting mechanisms disposed at different positions, respectively, for coaction with rear wheel steering mechanisms.
Figure 5:
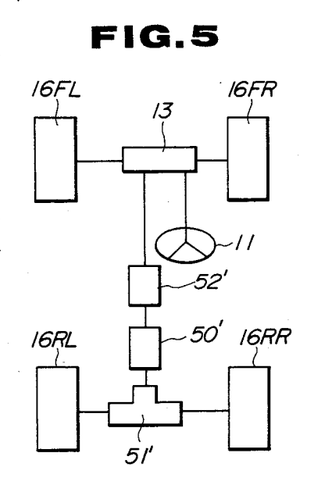
Figure 6:
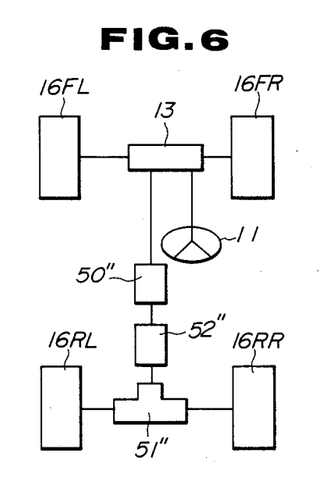

FIGS. 4, 5, and 6 show modifications of the aforesaid embodiment. In these modifications, there is provided a steering angle function setting mechanism which coacts with the rear wheel steering mechanism for setting a ratio between the steering angles of the front and rear wheels. Those parts in FIGS. 4, 5, and 6 which are identical to those of the above embodiment are denoted by identical reference characters, and will not be described in detail.

FIG. 4 shows a front and rear wheel steering apparatus in which a steering angle function setting mechanism 52 is incorporated in a rear wheel steering mechanism 51, and a viscous fluid coupling 50 is disposed more closely to steering wheel 11 than these mechanisms 51, 52. FIG. 5 illustrates a front and rear wheel steering apparatus in which a rear wheel steering mechanism 51' and a steering angle function setting mechanism 52' are separately provided, and a viscous fluid coupling 50' is disposed on a transmission system between these mechanisms 51', 52'. FIG. 6 shows a front and rear wheel steering apparatus in which a rear wheel steering mechanism 51" and a steering angle function setting mechanism 52" are separately provided, and a viscous fluid coupling 50" is disposed on a transmission system closer to the steering wheel 11 than the steering angle function setting mechanism 52".

In the aforesaid embodiment and modifications, the front wheel steering mechanism and the rear wheel steering mechanism are mechanically coupled to each other, and the viscous fluid coupling is disposed between these front and rear wheel steering mechanisms. In a front and rear wheel steering apparatus in which a rear wheel steering mechanism is directly coupled to a steering wheel, the viscous fluid coupling according to the present invention would be disposed between the steering wheel and the rear wheel steering mechanism.

With the front and rear wheel steering apparatus according to the first embodiment described above, since the fluid viscous fluid coupling is disposed on the system for transmitting the steering force to the rear wheels, the steering characteristics of the rear wheels are made dependent on the steering speed and the friction with the road for improved driving stability. Moreover, the transmission of vibration produced on the side of the rear wheels to the steering wheel is reduced to improve the steering feeling which the driver has while driving the motor vehicle.

FIGS. 8 through 14 illustrate a front and rear wheel steering apparatus according to a second embodiment of the present invention. In this embodiment, where the ratio of front and rear wheel steering angles is large, the rigidity of a rear wheel steering system can be varied dependent on the steering speed.

Figure 8:
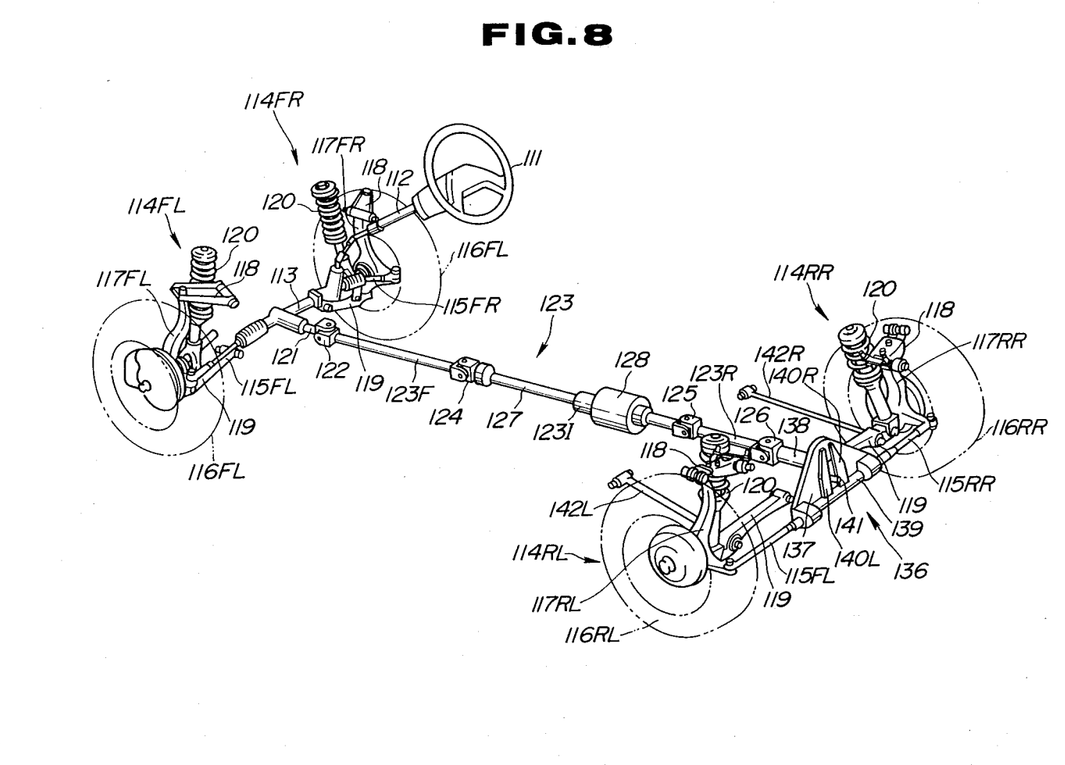
FIG. 8 is a perspective view of a front and rear wheel steering apparatus for a motor vehicle according to a second embodiment of the present invention.

As shown in FIG. 8, a steering wheel 111 is operatively coupled via a steering shaft 112 to a rack-and-pinion steering gear mechanism of a front wheel steering mechanism which is housed in a gearbox 113. The front wheel steering mechanism includes a rack having opposite ends coupled through linkages such as tie rods 115FL, 115FR to knuckles 117FL, 117FR of laterally spaced front wheels 116FL, 116FR supported by independent double-wishbone suspensions 114FL, 114FR, respectively. As well known in the art, the suspensions 114FL, 114FR have upper and lower arms 118, 119 swingably supported on a vehicle frame and coupled to the upper and lower ends of the knuckles 117FL, 117FR through ball-and-socket joints. The front wheels 116FL, 116FR are supported by the arms 118, 119 and the knuckles 117FL, 117FR. Rear suspensions 114RL, 114RR, described later, are constructed of components which are identical to those of the suspensions 114FL, 114FR, and these components are designated by identical reference numerals.

Figure 9:
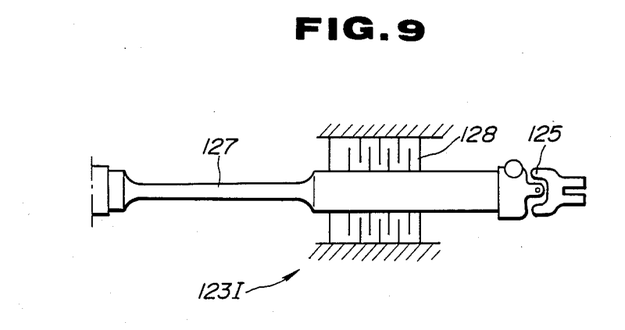
FIG. 9 is a fragmentary schematic view of a connector shaft having a torsion bar and a rotary damper.

A rear wheel output shaft 121 is rotatably supported in the gearbox 113, the rear wheel output shaft 121 extending in the rearward direction of the motor vehicle. The rear wheel output shaft 121 has a front end operatively coupled to the rack in the gearbox 113 through a transmission mechanism such as a rack-and-pinion gear mechanism for transmitting steering forces from the front wheel steering mechanism. The rear end of the rear wheel output shaft 121 is operatively coupled to a connector shaft 123 through a universal joint 122. The connector shaft 123 comprises a front shaft 123F, an intermediate shaft 123I, and a rear shaft 123R which are operatively coupled by universal joints 124, 125. The front shaft 123F has a front end operatively coupled to the rear wheel output shaft 121 through the universal joint 122. The intermediate shaft 123I has a front end coupled to the rear end of the front shaft 123F through the universal joint 124 and a rear end coupled to the front end of the rear shaft 123R through the universal joint 125. The rear shaft 123R has a rear end operatively coupled to a rear wheel steering mechanism 136 (described later) through a universal joint 126. As shown in FIG. 9, the intermediate shaft 123I has a front portion formed as a torsion bar 127 and a rear portion constructed as a rotary damper 128, the torsion bar 127 and the rotary damper 128 being coupled in line with each other. The torsion bar 127 has a prescribed degree of torsional rigidity and is allowed to be torsionally deformed dependent on the steering force applied. The rotary damper 128 produces resistive forces against rotation. The torsion bar 127 and the rotary damper 128 serve as a rigidity adjusting means.

Figure 10:
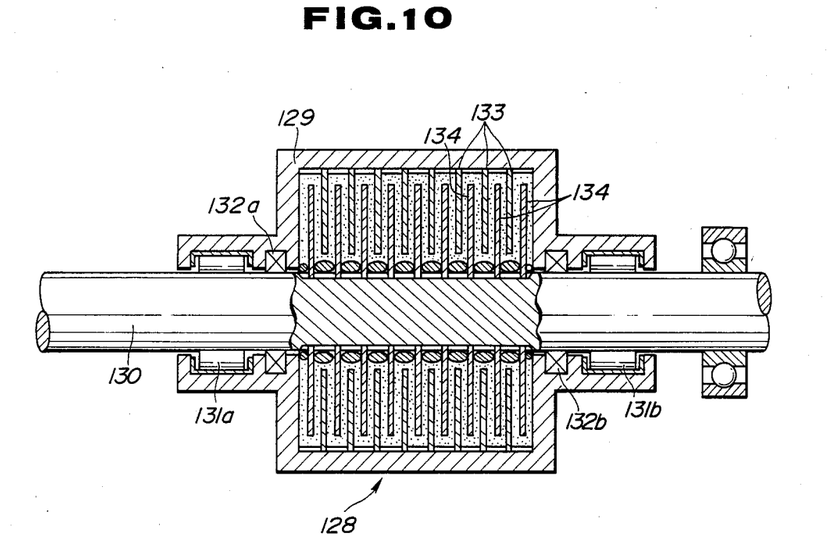
FIG. 10 is a cross-sectional view of the rotary damper.

As shown in FIG. 10, the rotary damper 128 comprises hub shaft 130 rotatably supported by bearings 131a, 131b in a substantially cylindrical housing 129 supported on the vehicle frame. The hub shaft 130 has a rear end coupled to the rear shaft 123R through the universal joint 125. The internal structure in the housing 129 is the same as that in the housing 24 of the first embodiment, and will not be described in detail. The rotary damper 128 is filled with a viscous fluid as a damper medium. The viscosity of the filled fluid is effective to produce resistive forces with respect to the relative rotational speeds of housing plates 133 and hub plates 134, i.e., the rotational speed of the connector shaft 123 (steering speed).

A rear wheel steering mechanism 136 has an input shaft 138 rotatably supported on a bracket 137 attached to the vehicle frame, the input shaft 138 extending longitudinally of the motor vehicle. The input shaft 138 has a front end coupled to the rear end of the rear shaft 123R through the universal joint 126. Further details of the rear wheel steering mechanism 136 are the same as those of the first embodiment, and will not be described.

Figure 11:
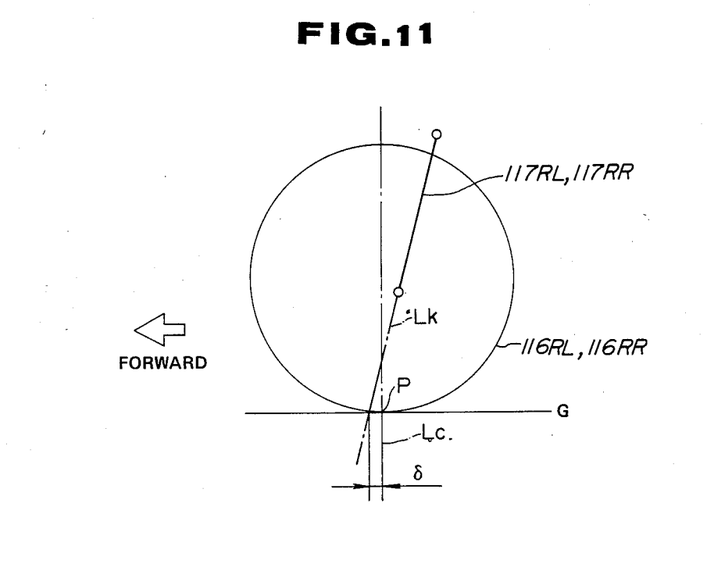
FIG. 11 is a schematic view of a rear wheel suspension.

Laterally spaced rear wheels 116RL, 116RR are supported by the independent double-wishbone suspensions 114RL, 114RR, respectively as discussed above. The suspensions 114RL, 114RR have upper and lower arms 118, 119 swingably supported on the vehicle frame and coupled to knuckles 117RL, 117RR through ball-and-socket joints. The rear wheels 116RL, 116RR are supported by the arms 118, 119 and the knuckles 117RL, 117RR. Denoted at 142L, 142R are radius rods, and 120 dampers. As shown in FIG. 11, the suspensions 114RL, 114RR are arranged such that a central kingpin line Lk interconnecting the joint between the lower arm 119 and the knuckle 117RL, 117RR and the joint between the upper arm 118 and the knuckle 117RL, 117RR intersects with the road surface G at a point which is spaced a distance δ from the vertical wheel center line Lc, the rear wheels 116RL, 116RR having a caster trail of δ. In FIG. 11, the lefthand side indicates the forward direction of the motor vehicle as represented by the arrow.

Figure 14:
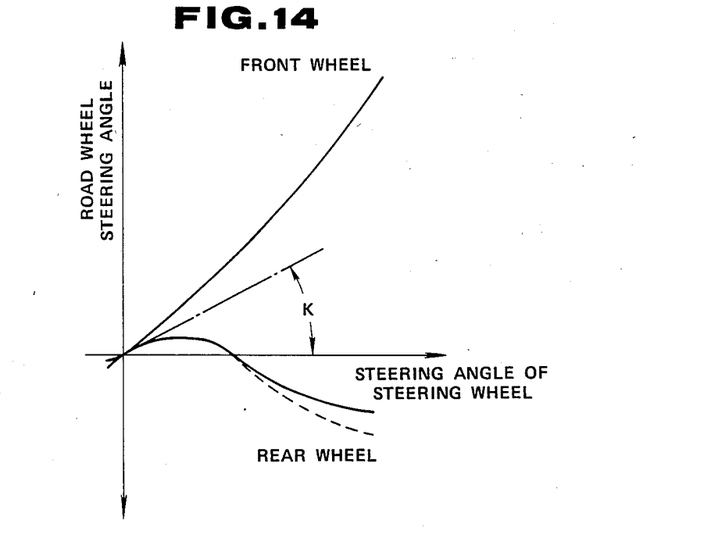
FIG. 14 is a graph illustrating steering angles of the front and rear wheels plotted against the steering angle of the steering wheel in the front and rear wheel steering apparatus of the second embodiment.

The front and rear wheel steering apparatus according to the second embodiment will operate as follows:

In the front and rear wheel steering apparatus, the steering wheel 111 is mechanically coupled to the front wheels 116FL, 116FR through the rack-and-pinion front wheel steering gear mechanism, etc., and the steering wheel 111 is mechanically coupled to the rear wheels 116RL, 116RR through the torsion bar 127, the rotary damper 128, the rear wheel steering mechanism 136, etc., so that the front wheels 116FL, 116FR and the rear wheels 116RL, 116RR can be steered in response to operation of the steering wheel 111. As illustrated in FIG. 14, the front wheels 116FL, 116FR are steered through an angle which varies in proportion to the steering angle of the steering wheel 111, and the rear wheels 116RL, 116RR are steered through an angle which varies in a substantially sine-curve pattern with respect to the steering angle of the steering wheel 111. The rear wheels 116RL, 116RR produce cornering forces dependent on the steering angle or slip angle. Therefore, the motor vehicle has an understeering tendency, resulting in increased maneuvering stability.

Figures 12A, 12B:
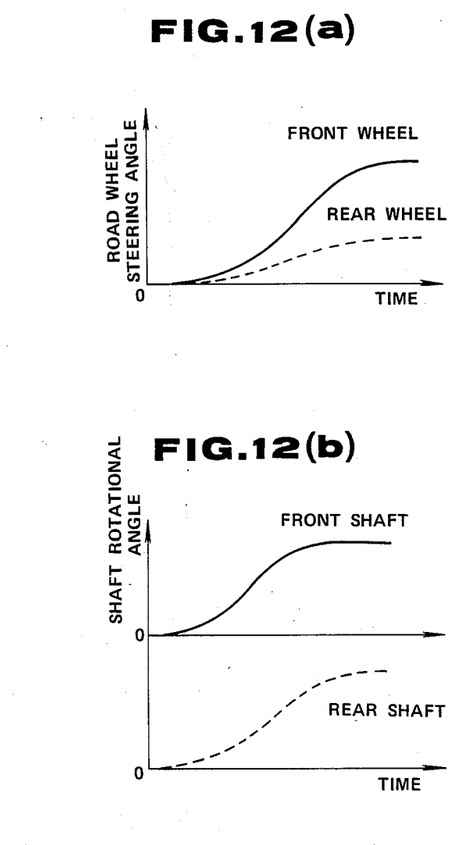
FIGS. 12(a) and 12(b) are graphs showing operating characteristics of the front and rear wheel steering apparatus of the second embodiment at the time the steering speed is low, FIG. 12(a) showing transfer characteristics of a rear wheel steering system, FIG. 12(b) showing steering characteristics of front and rear wheels.
Figures 13A, 13B:
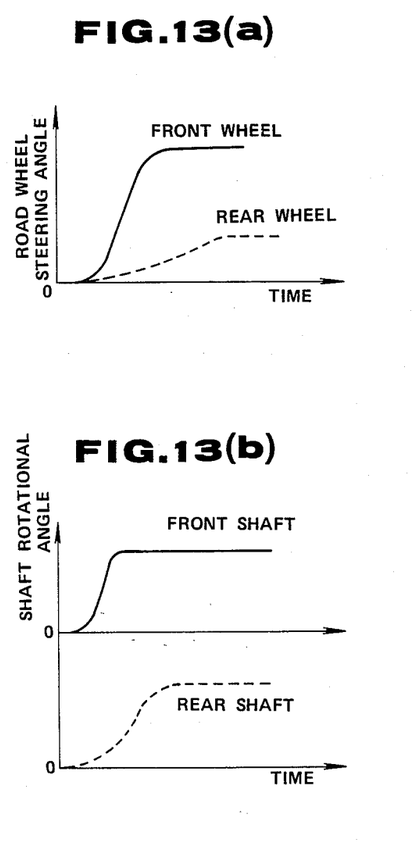
FIGS. 13(a) and 13(b) are graphs showing operating characteristics of the front and rear wheel steering apparatus of the second embodiment at the time the steering speed is high, FIG. 13(a) showing transfer characteristics of the rear wheel steering system, FIG. 13(b)

The connector shaft 123 interconnecting the steering wheel 111 and the rear wheels 116RL, 116RR has the torsion bar 127 and the rotary damper 128 which are disposed in series. The rotary damper 128 produces resistive forces dependent on the steering speed, whereas the torsion bar 127 develops a torsional displacement dependent on the resistive forces produced by the rotary damper 128 and resistive forces against the steering movement of the rear wheels 116RL, 116RR. Therefore, when the steering speed, i.e., the angular velocity of the front shaft 123F is low, the rotational angle of the front shaft 123F and the rotational angle of the rear shaft 123R are substantially the same as each other as shown in FIG. 12(b). However, when the steering speed is high, the rotational angle of the rear shaft 123R lags behind the rotational angle of the front shaft 123F as shown in FIG. 13(b). As a result, the front wheel steering angle and the rear wheel steering vary with respect to time as shown in FIG. 12(a) when the steering speed is low, and vary with respect to time as shown in FIG. 13(a) when the steering speed is high. When the steering speed is high, the rate K of change of the rear wheel steering angle is reduced for thereby developing large yaw acceleration on the motor vehicle. Therefore, when the driver steers the motor vehicle at a high steering speed, the motor vehicle can quickly make a turn, giving the driver a good steering feeling.

In the front and rear wheel steering apparatus, the caster trail of the rear wheels 116RL, 116RR is set to δ in the forward direction, and the central kingpin line Lk intersects with the road surface G at a point which is spaced δ forwardly from the vertical central line Lc of the wheel passing through a point P where the cornering force is applied. Consequently, when the rear wheels 116RL, 116RR are steered in a direction opposite to the direction in which the front wheels are steered, the produced lateral G is large, and a moment is imposed on the rear wheels 116RL, 116RR due to the cornering force. As indicated by the broken-line curve in FIG. 14, therefore, the rear wheels 116RL, 116RR are greatly steered under such a moment while torsionally deforming the torsion bar 127. Consequently, the radius of the turn which the motor vehicle is making can be reduced, and the maneuverability or the ease which the motor vehicle makes smaller turns is increased.

With the front and rear wheel steering apparatus according to the second embodiment of the present invention, even if the steering angle ratio between the front and rear wheels is large, when the steering speed is high, the rigidity of the steering system for the rear wheels is small, so that both good driving stability and good maneuverability can be attained without impairing the driver's steering feeling.

Since only the damper and the torsion bar are added to the steering arrangement without the need for any electric devices such as a sensor and the like in the second embodiment of the present invention, the front and rear wheel steering apparatus of mechanical structure which is sensitive to the steering speed can be manufactured inexpensively.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. An apparatus for steering the front and rear wheels of a motor vehicle, comprising:
   a steering wheel;
   front and rear wheels;
   a front wheel steering mechanism for steering said front wheels in response to operation of said steering wheel;
   a rear wheel steering mechanism for steering said rear wheels at least in the same direction as the direction in which said front wheels are steered;
   connector means disposed between and operatively interconnecting said front and rear wheel steering mechanisms for transmitting rotation of said steering wheel to said rear wheel steering mechanism through said front wheel steering mechanism; and
   a rotation control mechanism mounted on said connector means for applying a resistive force dependent on the speed of rotation of said steering wheel to said connector means.

2. An apparatus according to claim 1, wherein said rotation control mechanism comprises a rotary damper disposed between said connector means and a frame of the motor vehicle and employing a viscous fluid as a damper medium.

3. An apparatus according to claim 2, wherein said connector means comprises a first shaft comprising a torsion bar operatively coupled to said front wheel steering mechanism and a second shaft operatively coupled to said rear wheel steering mechanism, said first and second shafts being coupled in series with each other, said rotary damper being mounted on said second shaft.

4. An apparatus according to claim 1, wherein said connector means mechanically interconnects said front and rear wheel steering mechanisms.

5. An apparatus according to claim 1, wherein said rotation control mechanism comprises a viscous fluid coupling.

6. An apparatus according to claim 5, wherein said connector means comprises a first shaft operatively coupled to said front wheel steering mechanism and a second shaft operatively coupled to said rear wheel steering mechanism, said viscous fluid coupling being connected between said first and second shafts.

7. An apparatus according to claim 5, further including a steering angle ratio setting mechanism coacting with said rear wheel steering mechanism for setting a ratio between steering angles of the front and rear wheels, said connector means comprising a first portion disposed between said front wheel steering mechanism and said steering angle ratio setting mechanism and a second portion disposed between said steering angle ratio setting mechanism and said rear wheel steering mechanism, said viscous fluid coupling being mounted on said second portion.

8. An apparatus according to claim 5, further including a steering angle ratio setting mechanism coacting with said rear wheel steering mechanism for setting a ratio between steering angles of the front and rear wheels, said connector means comprising a first portion disposed between said front wheel steering mechanism and said steering angle ratio setting mechanism and a second portion disposed between said steering angle ratio setting mechanism and said rear wheel steering mechanism, said viscous fluid coupling being mounted on said first portion.

9. An apparatus according to claim 5, wherein said viscous fluid coupling has highly viscous fluid provided therein.

10. An apparatus according to claim 5, wherein said viscous fluid coupling has silicone oil provided therein.

11. An apparatus for steering the front and rear wheels of a motor vehicle, comprising:
    a steering wheel;
    front and rear wheels;
    a front wheel steering mechanism for steering said front wheels in response to operation of said steering wheel;
    a rear wheel steering mechanism for steering said rear wheels at least in the same direction as the direction in which said front wheels are steered;
    connector means disposed between and operatively interconnecting said front and rear wheel steering mechanisms for transmitting rotation of said steering wheel to said rear wheel steering mechanism through said front wheel steering mechanism; and
    a rotation control mechanism mounted on said connector means for applying a resistive force dependent on the speed of rotation of said steering wheel and on a coefficient of friction of a road surface on which the motor vehicle is traveling to said connector means.

* * * * *

UNITED STATES PATENT AND TRADEMARK OFFICE
CERTIFICATE OF CORRECTION

PATENT NO. : 4,902,028

DATED : February 20, 1990

INVENTOR(S) : Mitsuya SERIZAWA et al.

It is certified that error appears in the above-identified patent and that said Letters Patent is hereby corrected as shown below:

Column 1, line 12, after "mechanically" insert a comma.
Column 5, line 8, change "affected" to --effected--.
Column 7, line 40, after "respectively" insert a comma.
Column 8, line 57, before "which" insert --with--.

Signed and Sealed this

Eighth Day of October, 1991

Attest:

HARRY F. MANBECK, JR.

*Attesting Officer*   *Commissioner of Patents and Trademarks*